United States Patent [19]

Kawamoto et al.

[11] Patent Number: 5,308,371
[45] Date of Patent: May 3, 1994

[54] METHOD OF FORMING FLUORIDE GLASS FIBER PREFORM

[75] Inventors: Hiromi Kawamoto; Yoshinori Kubota; Natsuya Nishimura; Akira Sakanoue, all of Ube, Japan

[73] Assignee: Central Glass Co., Ltd., Ube, Japan

[21] Appl. No.: 47,522

[22] Filed: Apr. 19, 1993

[30] Foreign Application Priority Data

Apr. 28, 1992 [JP] Japan .................. 4-110442

[51] Int. Cl.⁵ .......................................... C03B 37/023
[52] U.S. Cl. .......................................... 65/3.110; 65/2; 65/13; 65/102
[58] Field of Search ........................ 65/2, 3.11, 13, 102

[56] References Cited

U.S. PATENT DOCUMENTS

| | | | |
|---|---|---|---|
| 4,063,914 | 12/1977 | Roeder | 65/2 |
| 4,253,731 | 3/1981 | Anderson et al. | 264/1.5 |
| 4,898,603 | 2/1990 | Hutta | 65/3.11 |
| 5,185,021 | 2/1993 | Miura et. al. | 65/3.11 |

FOREIGN PATENT DOCUMENTS

| | | |
|---|---|---|
| 0420239 | 9/1990 | European Pat. Off. |
| 2440770 | 3/1975 | Fed. Rep. of Germany |
| 57-191240 | 11/1982 | Japan |
| 58-125630 | 7/1983 | Japan |
| 63-11535 | 1/1988 | Japan |
| 63-190739 | 8/1988 | Japan |
| 3-183630 | 8/1991 | Japan |
| 4-31333 | 2/1992 | Japan |
| 1194386 | 9/1968 | United Kingdom |

*Primary Examiner*—Robert L. Lindsay
*Attorney, Agent, or Firm*—Keck, Mahin & Cate

[57] ABSTRACT

A method of forming a fiber glass preform includes the steps of: (a) pouring a cladding glass into a mold; (b) pouring a core glass on a flat horizontal upper surface of the cladding glass so as to form a united glass body having the core glass and the cladding glass under a condition that viscosity of the cladding glass and viscosity of the core glass are adjusted to certain predetermined values respectively so that the core glass is separated from and placed on the cladding glass; (c) cooling the united glass body to solidify the same so that the cladding glass is deformed by contraction thereof so as to produce a depression at a top middle portion thereof and that the core glass is deformed so as to form a projected portion thereof to fill the depression therewith; (d) separating the united glass body into an upper portion and a lower portion comprising the projected portion of the core glass; and (e) extruding the lower portion of the united glass body so as to form the fiber glass preform.

7 Claims, 3 Drawing Sheets

METHOD OF FORMING FLUORIDE GLASS FIBER PREFORM

BACKGROUND OF THE INVENTION

This invention relates to a method of forming fluoride glass fiber preforms for optical communication.

The application of fluoride glass fibers is expected in the field of optical communication, for example, the fiber optical amplifier operating at 1.3 μm-band, the optical waveguide and the fiber laser because its light transmittance region is wide and the transmittance of infrared region therethrough is particularly high as compared with oxide glass fibers and plastic fibers. However, there are some drawbacks of fluoride glass in the preparation of optical fiber preforms. That is, fluoride glass tends to react with water in the atmosphere and to be crystallized.

There are some usual methods of forming fluoride glass fiber preforms. For example, JP-A-57-191240 discloses a build-in casting method. In this method, firstly, a fluoride glass melt for the cladding is poured into a mold which comprises a plurality of separable elongate portions. Then, an unsolidified central portion of the fluoride glass melt is allowed to flow out. After that, another fluoride glass melt for the core is poured into the central portion of the mold.

JP-A-58-125630 discloses a rotational casting method. In this method, firstly, a fluoride glass melt for the cladding is poured into a rotating mold. Then, an unsolidified central portion of the fluoride glass melt is allowed to flow out. After that, another fluoride glass melt for the core is poured into the central portion of the rotating mold. However, the above-mentioned two methods have the following drawbacks.

It is needed to repeat casting in a relatively short time. Bubbles and striae tend to be incorporated into the glass because it is necessary to pour a core glass melt into a central opening of a cladding glass tube. Furthermore, the cladding glass is reheated and thus tends to be crystallized by pouring a large amount of the core glass melt into the cladding glass tube which has started to solidify.

JP-A-3-183630 discloses an extrusion method in which a solidified core glass body and a solidified cladding glass body are mated with each other at their ground surfaces and the mated glass body is extruded.

JP-A-63-190739 discloses a rod-in-tube method. In this method, a solidified core glass rod is inserted into a solidified cladding glass tube so as to form a preform. After that, the preform is melted, and then the melted preform is drawn.

The above-mentioned extrusion method and rod-in-tube method have the following drawbacks.

In the methods, at first, the core glass and the cladding glass are separately prepared. Therefore, the incorporation of impurities into the glass tends to be suppressed. However, a high gain can not be obtained due to irregular interface between the core and the cladding. Furthermore, it is difficult to prepare a preform for a single-mode optical fiber and in particular to have a diametral ratio of cladding to core more than about 15:1.

JP-A-63-11535 discloses a suction method in which a cladding glass melt is poured into a mould which is formed at its lower end with a sink for the cladding glass melt, and then a core glass melt is poured on the cladding glass melt. During cooling of the cladding glass melt, a void space is produced at the center of the cladding glass body due to contraction of the cladding glass in the sink. Accordingly, the void space is filled with the core glass melt so that a preform having a core-cladding structure is prepared. However, this method has the following drawbacks.

The core diameter does not become constant because the central void space for the core is produced due to only contraction of the cladding glass in the sink. Furthermore, it is difficult to obtain a long preform.

JP-A-4-31333 discloses a method in which a preform made by the rod-in-tube method or the suction method is drawn so as to obtain a core having a uniform diameter, and then the outer surface of a cladding is ground so as to obtain the cladding having a uniform diameter. However, in this method, crystallization at the interface between the core and the cladding tends to occur, thereby lowering strength of the preform.

SUMMARY OF THE INVENTION

It is therefore an object of the present invention to provide an improved method of forming a fluoride glass fiber preform, which is free of the above-mentioned drawbacks.

According to the present invention, there is provided a method of forming a fiber glass preform, comprising the steps of:

(a) pouring a cladding glass into a mold;

(b) pouring a core glass on a flat horizontal upper surface of said cladding glass so as to form a united glass body having said core glass and said cladding glass under a condition that viscosity of said cladding glass and viscosity of said core glass are adjusted to certain predetermined values respectively so that said core glass is separated from and placed on said cladding glass;

(c) cooling said united glass body to solidify the same so that said cladding glass is deformed by contraction thereof so as to produce a depression at a top middle portion thereof and that said core glass is deformed so as to form a projected portion thereof to fill said depression therewith;

(d) separating said united glass body into an upper portion and a lower portion which comprises said projected portion of said core glass; and (e) extruding said lower portion of said united glass body so as to form the fiber glass preform.

In the present invention, due to the combination of casting and extrusion process, it is not necessary to repeat casting in a relatively short time.

The incorporation of bubbles and stride into the glass does not tend to occur because the core glass is poured on a flat horizontal upper surface of the cladding glass melt.

The amount of core glass can be decreased to the amount corresponding to the volume of contraction of the cladding glass. Therefore, crystallization of the cladding glass due to reheating of the same does not tend to occur.

A preform having an arbitrary diametral ratio of cladding to core can be obtained by controlling the shape of the depression caused by contraction of the cladding glass.

DESCRIPTION OF THE PREFERRED EMBODIMENTS

Figure 1:
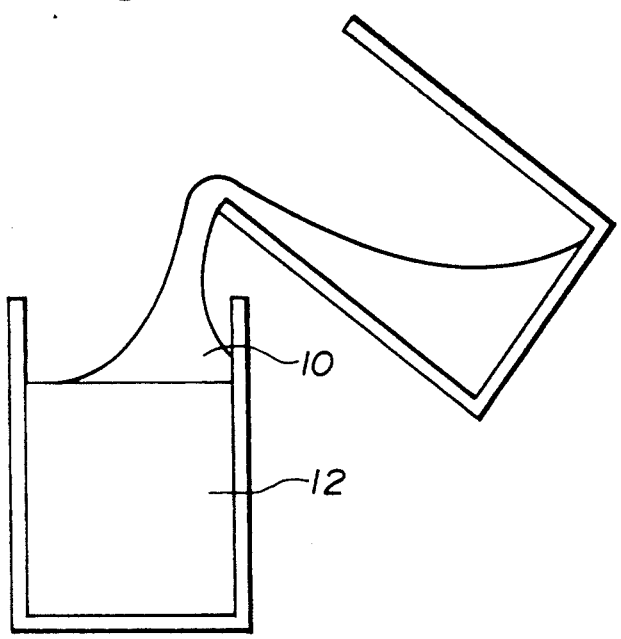
FIGS. 1 to 6 are sectional views showing a sequential process of forming a fluoride glass fiber preform in accordance with the present invention.

With reference to FIGS. 1 to 6, a method of forming a fluoride glass fiber preform according to the present invention will be described in the following.

Firstly, a cladding glass melt in a mold is cooled to a certain predetermined temperature so as to suppress flow therein. Under this condition, as is seen from FIG. 1, a certain predetermined amount of a core glass melt 10 having a certain predetermined temperature is gently poured on the cladding glass melt 12 so as to form a united cylindrical glass body and not to disturb an upper surface of the cladding glass melt. With this, as is seen from FIG. 2, this cylindrical glass body has the core glass melt phase 10 and the cladding glass melt phase 12 which are separated from each other. Then, the cylindrical glass body is allowed to cool down. After cooling, as is seen from FIG. 3, the cladding glass 12 deforms by contraction so as to produce a depression 14 at a top middle portion thereof, and the core glass 10 also deforms so as to fill the depression 14 with a projected portion 16 of the core glass 10. It should be noted that the cylindrical glass body having a shape shown in FIG. 3 is not suitable for the preparation of the glass fiber preform. Therefore, according to the present invention, as is seen from FIG. 4, an upper portion 18 of the cylindrical glass body is removed so as to leave the projected portion 16 of the core glass 10 in a lower portion 19. Then, as is seen from FIGS. 5 and 6, the lower portion 19 of the cylindrical glass body is set in an extruder and extruded by a usual extrusion method. With this, a preform having a uniform core diameter (i.e. a preform defined between dotted lines) is obtained. Extrusion is conducted at a temperature ranging from sag temperature to the crystallization temperature, and preferably at a temperature at which viscosity of the glass is from $10^9$ to $10^6$ poises. If the temperature is lower than sag temperature, it is difficult to extrude the glass body. If the temperature is higher than the crystallization temperature, the preform will have crystals therein. This causes scattering loss.

Figure 7:
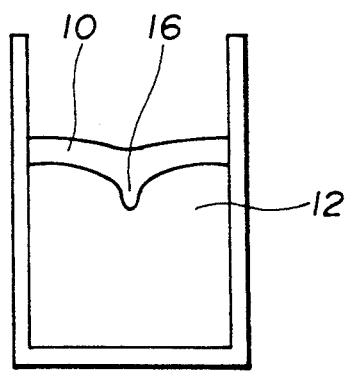
FIG. 7 is a view similar to FIG. 3, but showing another embodiment in which a small amount of a cladding glass melt is used.
Figure 8:
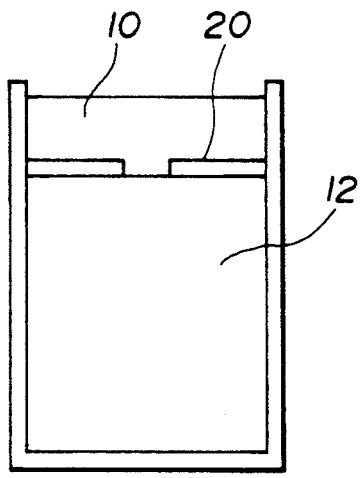
FIGS. 8 and 9 are views similar to FIGS. 2 and 3, but showing still another embodiment in which a disklike plate having a center hole is used.
Figure 9:
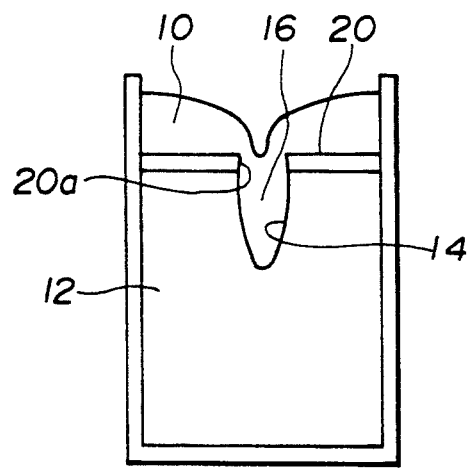

In the present invention, the size and shape of the projected portion 16 of the core glass 10 can controlled by the amount of the cladding glass melt to be poured into the mold. For example, as is seen from FIG. 7, when the amount of the cladding glass melt is decreased, the size of the projected portion 16 of the core glass 10 is decreased due to reduction in contraction volume of the cladding glass 12. The size and shape of the projected portion 16 of the core glass 10 can be controlled by the usage of an optional disklike plate having a center hole, too. As is seen from FIGS. 8 and 9, if the core glass melt 10 is poured on the disklike plate 20 which is placed on the cladding glass melt 12, and then the cylindrical glass body is cooled, the depression 14 of the cladding glass 12 and the projected portion 16 of the core glass 10 are formed in such a manner that the size and shape of the projected portion 16 is controlled by the size of the center hole 20a of the disklike plate 20, as illustrated. For example, if the amount of the cladding glass melt is constant, the projected portion 16 becomes more elongate in shape by decreasing the size of the center hole 20a of the disklike plate 20. It is desired that the projected portion has an elongate shape so as to obtain a long preform having a constant core diameter. Thus, the size and shape of the projected portion 16 of the core glass 10 is arbitrarily controlled or designed by the amount of the cladding glass melt 12, viscosity of the cladding glass melt 12, cooling speed of the cladding glass melt 12, the size of the center hole 20a of the disklike plate 20 or the combination of these factors.

Figure 2:
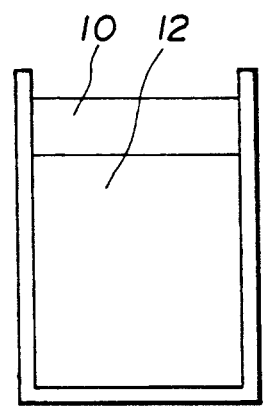
Figure 3:
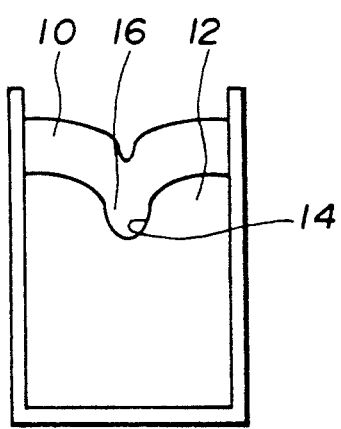
Figure 4:
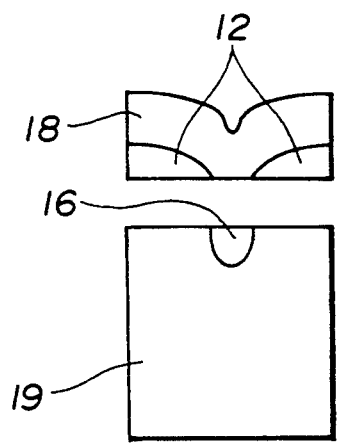
Figure 5:
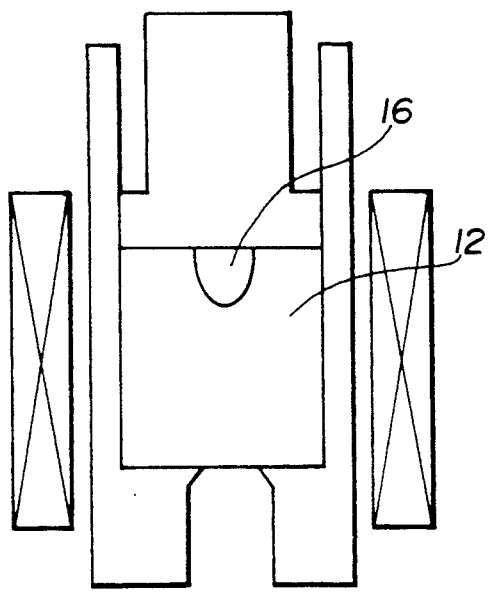
Figure 6:
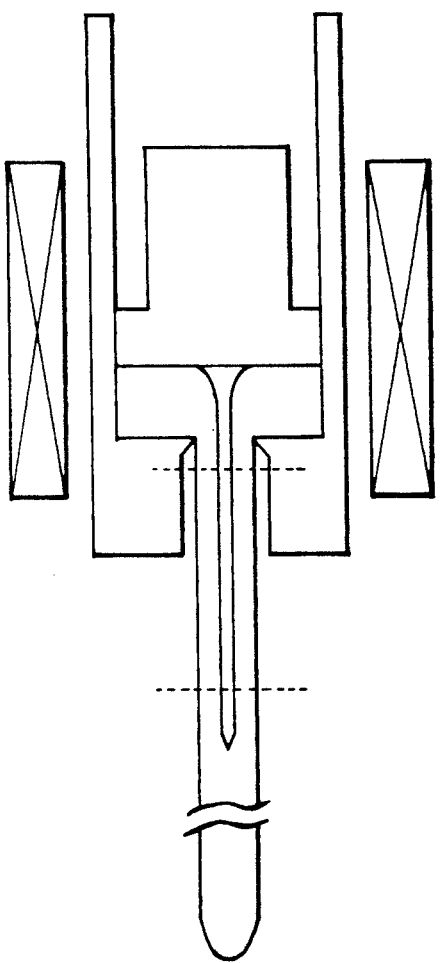

In the present invention, it is necessary that the core glass melt phase 10 is separated from the cladding glass melt phase 12, as is illustrated in FIG. 2, when the core glass melt 10 is poured on the cladding glass melt 12. For this purpose, it is necessary that, upon pouring, viscosity of the cladding glass melt is in the range from $10^4$ to $10^2$ poises and that viscosity of the core glass melt is in the range from $10^2$ to 1 poise. If viscosity of the cladding glass melt is greater than $10^4$ poises upon pouring, the cladding glass is reheated so as to speed up the crystal growth speed. Therefore, it is possible that the cladding glass is crystallized. If viscosity of the core glass melt is greater than $10^2$ poises, it becomes to difficult to conduct casting. If viscosity of the core glass melt is less than 1 poise, bubbles tend to be incorporated into the glass.

In the following, the present invention will be described with reference to nonlimitative examples.

EXAMPLE 1

To prepare the core glass (fluoride glass), a first batch of glass composition was prepared by mixing 53 mol % of $ZrF_4$, 20 mol % of $BaF_2$, 4 mol % of $LaF_3$, 3 mol % of $AlF_3$ and 20 mol % of NaF.

To prepare the cladding glass (fluoride glass), a second batch of glass composition was prepared by mixing 10 mol % of $ZrF_4$, 40 mol % of $HfF_4$, 19 mol % of $BaF_2$, 3 mol % of $LaF_3$, 2 mol % of $YF_3$, 4 mol % of $AlF_3$ and 22 mol % of NaF.

50 g of the first batch and 160 g of the second batch were respectively put into first and second crucibles which are made of amorphous carbon and have a diameter of 35 mm and a height of 65 mm, and melted in the atmosphere of argon gas at a temperature of 850° C. for 2 hr and then at a temperature of 650° C. for 30 min.

Figure 10:
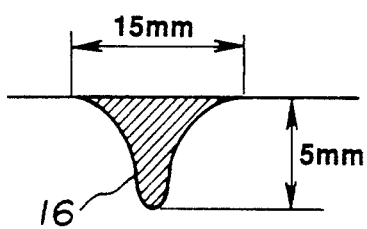
FIGS. 10 to 13 are enlarged sectional views showing projected portions of a core glass melt with which depressions of the cladding glass are filled.

After that, the second crucible containing the second batch was put on a stainless plate heated at a temperature of 150° C. In about 7 min, the first crucible containing the first batch was put on the stainless plate. In about 10 min, about 10 g of the core glass melt was poured on the cladding glass melt so as to form a first cylindrical glass body. In 1 min, the second crucible containing the cladding glass melt and the core glass melt was put into an annealing furnace heated at a temperature of 270° C. so as to conduct annealing to room temperature. Then, as is seen from FIG. 4, an upper portion 18 of the first cylindrical glass body was removed. Thus, a lower portion 19 of the first cylindrical glass body, or a second cylindrical glass body having a diameter of 33 mm, a height of 35 mm and the projected portion 16 of the core glass, which is shown in FIG. 10, was obtained. As is seen from FIG. 5, the second cylindrical glass body was set in an extruder having a die hole diameter of 10 mm, and then extruded with a certain pressure at a temperature of 285° C. With this, as is seen from FIG. 6, a cylindrical rod having a diameter of 11 mm and a longitudinal length of 300 mm was obtained. From this rod, a preform having a constant core glass diameter of 1 mm, a cladding glass diameter of 11 mm and a longitudinal length of 150 mm was taken.

EXAMPLE 2

A method according to Example 1 was repeated except that a first batch of glass composition for a core fluoride glass was prepared by mixing 49 mol % of $ZrF_4$, 25% of $BaF_2$, 4 mol % of $LaF_3$, 2 mol % of $YF_3$, 2 mol % of $AlF_3$ and 18 mol % of LiF, so as to obtain a second cylindrical glass body having a diameter of 33 mm, a height of 35 mm and a projected portion of the core glass therein which is shown in FIG. 10.

Then, the second cylindrical glass body was extruded with an extruder having a die hole diameter of 5 mm. With this, a preform having a cladding diameter of 5.5 mm, a core diameter of 0.5 mm and a longitudinal length of 330 mm was obtained.

EXAMPLE 3

Figure 11:
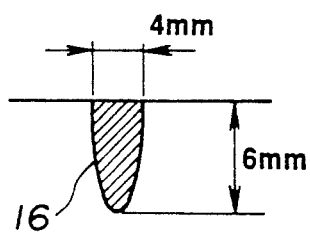

A method according to Example 1 was repeated except that a disklike plate having a center hole was placed on the second batch put in the second crucible, and then the first and second batches were separately melted under a condition according to Example 1. Then, the second crucible was put on a stainless plate heated at a temperature of 150° C. In about 6 min, the first crucible was put on the stainless plate. In about 9 min, about 10 g of the core glass melt was poured on the cladding glass melt so as to form a first cylindrical glass body. In 1 min, the second crucible containing the core glass melt and the cladding glass melt was annealed in accordance with Example 1. Then, as is seen from FIG. 4, an upper portion 18 of the cylindrical glass body was removed. Thus, a lower portion of the first cylindrical glass body, or a second cylindrical glass body having a diameter of 33 mm, a height of 35 mm and the projected portion 16 of the core glass therein witch is shown in FIG. 11 was obtained. The second cylindrical glass body was extruded in accordance with a method of Example 1. With this, a preform having a cladding diameter of 11 mm, a core diameter of 1.2 mm and a longitudinal length of 150 mm was obtained.

EXAMPLE 4

Figure 12:
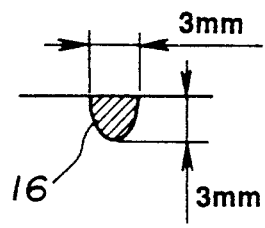

A method according to Example 3 was repeated so as to prepare a second cylindrical glass body having a diameter of 33 mm and a height of 35 mm. Then, the upper side of the second cylindrical glass body was ground by a thickness of 3 mm. The thus obtained cylindrical glass body had a diameter of 33 mm and a height of 32 mm and the projected portion 16 of the core glass therein which is shown in FIG. 12. This cylindrical glass body was extruded in accordance with a method of Example 1. With this, the obtained preform had a cladding diameter of 11 mm, a core diameter of 0.2 mm and a longitudinal length of 150 mm.

EXAMPLE 5

To prepare the core glass (fluoride glass), a first batch of glass composition was prepared by mixing 50 mol % of $ZrF_4$, 20 mol % of $BaF_2$, 5 mol % of $PbF_2$, 4 mol % of $LaF_3$, 2 mol % of $YF_3$, 2 mol % of $AlF_3$ and 17 mol % of LiF.

To prepare the cladding glass (fluoride glass), a second batch of glass composition was prepared in accordance with Example 1.

50 g of the first batch and 160 g of the second batch were respectively put into first and second crucibles and melted in accordance with Example 1.

Figure 13:
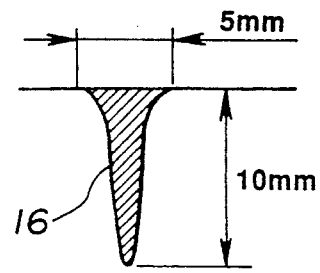

After that, the second crucible containing the second batch was put on a stainless plate heated at a temperature of 150° C. Then, argon gas was uniformly applied to a side wall of the second crucible so as to forcibly cool the cladding glass. In about 4 min, the first crucible containing the first batch was put on the stainless plate. In about 7 min, about 15 g of the core glass melt was poured on the cladding glass melt so as to form a first cylindrical glass body. Then, argon gas was applied to the side wall of the second crucible for 30 sec. Then, the second crucible was annealed in accordance with Example 1. Then, as is seen from FIG. 4, an upper portion of the first cylindrical glass body was removed. Thus, a lower portion of the first cylindrical glass body, or a second glass body had the projected portion of the core glass therein which is shown in FIG. 13. The second cylindrical glass body was extruded in accordance with Example 1. With this, a cylindrical rod having a diameter of 11 mm and a longitudinal length of 300 mm was obtained. From this rod, a preform having a constant core diameter of 0.7 mm, a cladding glass diameter of 11 mm and a longitudinal length of 180 mm was taken.

EVALUATION TEST

In each of Examples 1-5, the obtained preform was observed with an optical microscope. With this, impurities such as crystals and bubbles were not found. In each of Examples 1-5, He—Ne laser beam was applied to the core glass. With this, scattered light at the interface between the core glass and the cladding glass was not observed with naked eyes.

What is claimed is:

1. A method of forming a fiber glass preform, comprising the steps of:
    (a) pouring a cladding glass into a mold;
    (b) pouring a core glass on a flat horizontal upper surface of said cladding glass so as to form a united glass body having said core glass and said cladding glass under a condition that viscosity of said cladding glass and viscosity of said core glass are adjusted to certain predetermined values respectively so that said core glass is separated from and placed on said cladding glass;
    (c) cooling said united glass body to solidify the same so that said cladding glass is deformed by contraction thereof so as to produce a depression at a top middle, portion thereof and that said core glass is deformed so as to form a projected portion thereof to fill said depression therewith;
    (d) separating said united glass body into an upper portion and a lower portion which comprises said projected portion of said core glass; and
    (e) extruding said lower portion of said united glass body so as to form the fiber glass preform.

2. A method according to claim 1, wherein in the step (b) viscosity of said cladding glass and viscosity of said core glass are adjusted to a range from $10^4$ to $10^2$ poises and a range from $10^2$ to 1 poise, respectively.

3. A method according to claim 1, wherein said projected portion of said core glass is controlled in volume and size by adjusting the amount of said cladding glass, viscosity of said cladding glass in the step (b) and cooling speed of said united glass body in the step (c).

4. A method according to claim 1, wherein in the step (e) said lower portion of said united glass body is extruded at a temperature ranging from sag temperature to crystallization temperature.

5. A method according to claim 1, wherein said cladding glass is a fluoride glass and said core glass is another fluoride glass.

6. A method of forming a fiber glass preform, comprising the steps of:
(a) pouring a cladding glass into a mold;
(b) placing a disk having a center hole thereof on a flat horizontal upper surface of said cladding glass;
(c) pouring a core glass on said disk so as to form a united glass body having said core glass and said cladding glass with an interposal of said disk under a condition that viscosity of said cladding glass and viscosity of said core glass are adjusted to certain predetermined values respectively so that said core glass is separated om and placed on said cladding glass;
(d) cooling said united glass body to solidify the same so that said cladding glass is deformed by contraction thereof so as to produce a depression at a top middle portion thereof and that said core glass is deformed so as to form a projected portion thereof to fill said depression therewith;
(e) separating said united glass body into an upper portion comprising said disk and a lower portion comprising said projected portion of said core glass; and
(f) extruding said lower portion of said united glass body so as to form the fiber glass preform.

7. A method according to claim 6, wherein said projected portion of said core glass is controlled in volume and size by adjusting the size of said center hole of said disk.

* * * * *